(12) United States Patent
Pugh (10) Patent No.: US 11,224,308 B2
(45) Date of Patent: *Jan. 18, 2022

(54) EMBOSSED PAPER-BASED BAKEABLE TRAY

(71) Applicant: Smart Packaging, LLC, Plymouth, MN (US)

(72) Inventor: Jeffrey D. Pugh, Minnetonka, MN (US)

(73) Assignee: Smart Packaging, LLC, Plymouth, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/436,018

(22) Filed: Jun. 10, 2019

(65) Prior Publication Data

US 2019/0290057 A1 Sep. 26, 2019

Related U.S. Application Data

(63) Continuation of application No. 15/960,504, filed on Apr. 23, 2018, now Pat. No. 10,314,429, which is a continuation of application No. 13/832,076, filed on Mar. 15, 2013, now Pat. No. 9,949,593, which is a continuation-in-part of application No. 13/273,029, filed on Oct. 13, 2011, now Pat. No. 9,744,738.

(51) Int. Cl.
*A47J 36/02* (2006.01)
*D21H 27/02* (2006.01)
*A47J 36/04* (2006.01)

(52) U.S. Cl.
CPC ............ *A47J 36/022* (2013.01); *A47J 36/04* (2013.01); *D21H 27/02* (2013.01)

(58) Field of Classification Search
CPC .......... A47J 36/022; A47J 36/04; D21H 27/02
USPC ... 220/573.1, 573.2, 573.3, 574, 574.3, 608, 220/912
See application file for complete search history.

*Primary Examiner* — Jeffrey R Allen
(74) *Attorney, Agent, or Firm* — Thomas J. Oppold; Larkin Hoffman Daly & Lindgren, Ltd.

(57) ABSTRACT

An embossed paper-based bakeable tray having a bottom surface and sidewalls and an embossed pattern formed in the bottom surface providing a series of closely spaced projections substantially entirely over the bottom surface.

24 Claims, 8 Drawing Sheets

EMBOSSED PAPER-BASED BAKEABLE TRAY

BACKGROUND

Paper-based, oven-ready or bakeable trays are well known in the art for baking, heating, or reheating foods. Such paper-based bakeable trays are commonly used by "take-and-bake" pizza companies. Paper-based bakeable trays are also used by makers of frozen pizza, partial baked "par-bake" and raw pizza dough. These paper-based bakeable trays include barrier coatings such that they are impermeable to liquids and can withstand typical oven temperatures. While these trays may serve their intended purpose, it has been found that when foods are baked in these conventional trays, the food may not cook uniformly. For example, when pizza is cooked on these conventional trays, that the pizza crust in the middle of the tray is often soft and doughy. Accordingly there is a need for a paper-based bakeable tray that promotes uniform cooking.

Additionally, conventional paper-based bakeable trays have a flat or substantially flat bottom. When the cooked food is allowed to sit in these flat bottom trays, the food often becomes soggy from condensation or from grease or other juices dripping from the food. Accordingly there is a need for a paper-based bakeable tray that minimizes or prevents the food baked within the tray from becoming soggy due to condensation or from sitting in its own juices while cooking or after cooking.

DESCRIPTION

Figure 1:
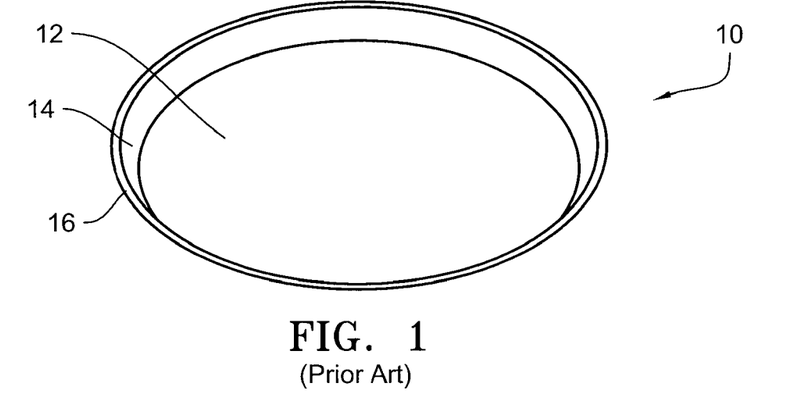
FIG. 1 is a perspective view of one type of conventional paper-based bakeable tray with a flat bottom surface.
Figure 2:
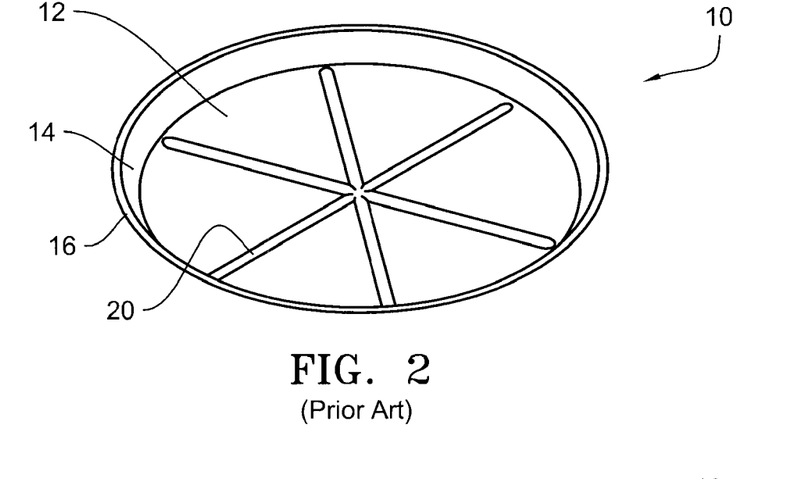
FIG. 2 is a perspective view of another type of conventional paper-based bakeable tray with raised contour surfaces in the form of a pinwheel pattern on the bottom surface of the tray.
Figure 3:
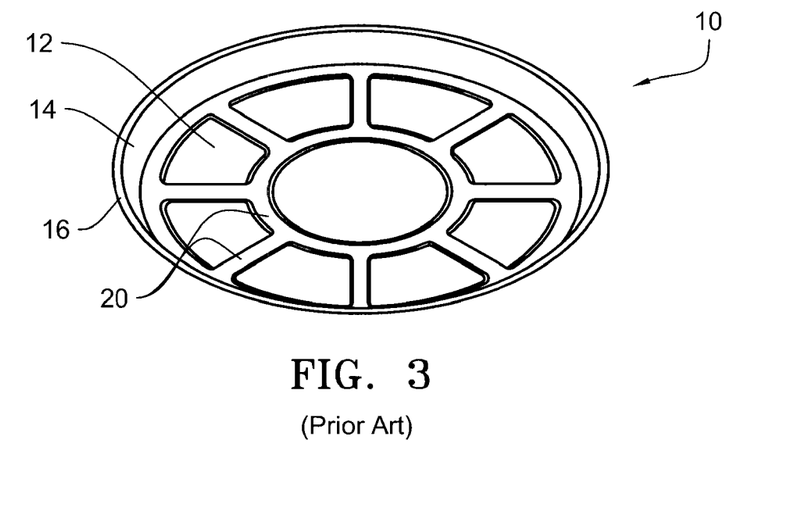
FIG. 3 is a perspective view of yet another type of conventional paper-based bakeable with raised contour surfaces in the form of an octagonal pattern on the bottom surface of the tray.

Referring to the drawings, wherein like reference numerals designate identical or corresponding parts throughout the several views, FIG. 1 illustrates a conventional paper-based bakeable tray 10 having a bottom surface 12 and sidewalls 14. The sidewalls may include a peripheral lip 16. FIG. 2 illustrates a conventional paper-based bakeable tray 10 having raised contour surfaces 20 formed in the bottom surface 12 in the form of a pinwheel pattern. FIG. 3 illustrates a conventional paper-based bakeable tray 10 having raised contour surfaces 20 formed in the bottom surface 12 in the form of a an octagonal pattern. The conventional paper-based trays 10 are typically formed using a thermoforming process. As recognized and understood by those of skill in the art, barrier coatings or barrier materials may be applied to the paper-based material, before, during or after the thermoforming process or otherwise incorporated into the paper-based material such that the trays are impermeable to liquids and/or to withstand typical oven temperatures.

Figures 4, 5:
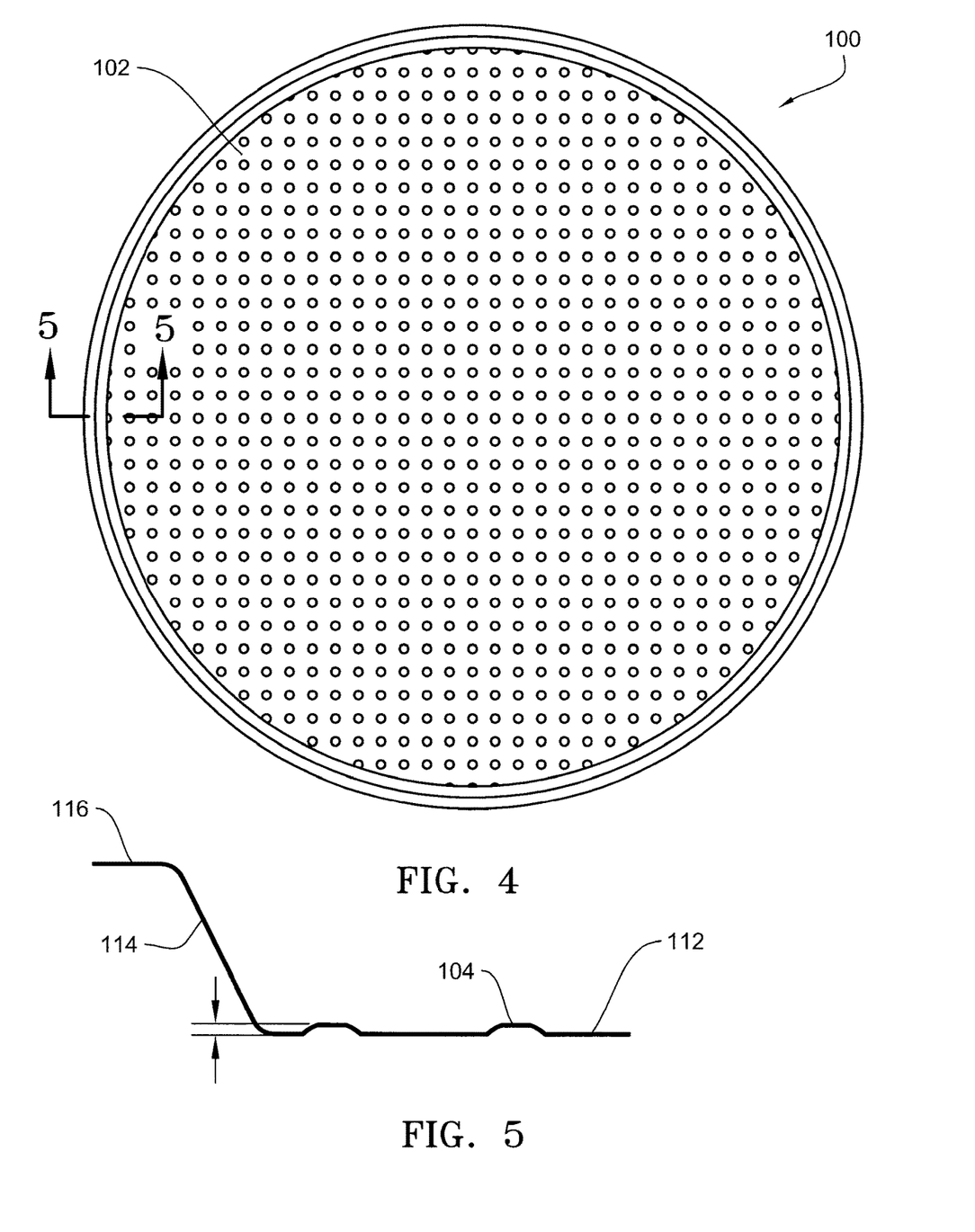
FIG. 4 is a plan view of one embodiment of a paper-based bakeable tray similar to the conventional paper-based bakeable tray of FIG. 1, but with an embossing pattern comprising upward projections on the bottom surface of the tray.
FIG. 5 is a partial cross-sectional view of the embossed paper-based bakeable tray of FIG. 4 as viewed along lines 5-5 of FIG. 4.

FIG. 4 illustrates an embossed paper-based bakeable tray 100 similar to the conventional paper-based bakeable tray 10 of FIG. 1. The embossed paper-based bakeable tray 100 has a bottom surface 112 and sidewalls 114. The sidewalls 114 may include a peripheral lip 116. However, unlike the conventional tray 10, the embossed tray 100 includes an embossed pattern 102 formed in the bottom surface 112 of the tray. FIG. 5 is a partial cross-sectional view of the tray 100 as viewed along lines 5-5 of FIG. 4. As used herein, the term "embossed pattern" should be understood to include any type of stamping, imprinting, pressing or forming process that creates a series of closely spaced intermittent projections as opposed to raised contour surfaces 20 as depicted in FIGS. 2 and 3.

Figures 6, 7:
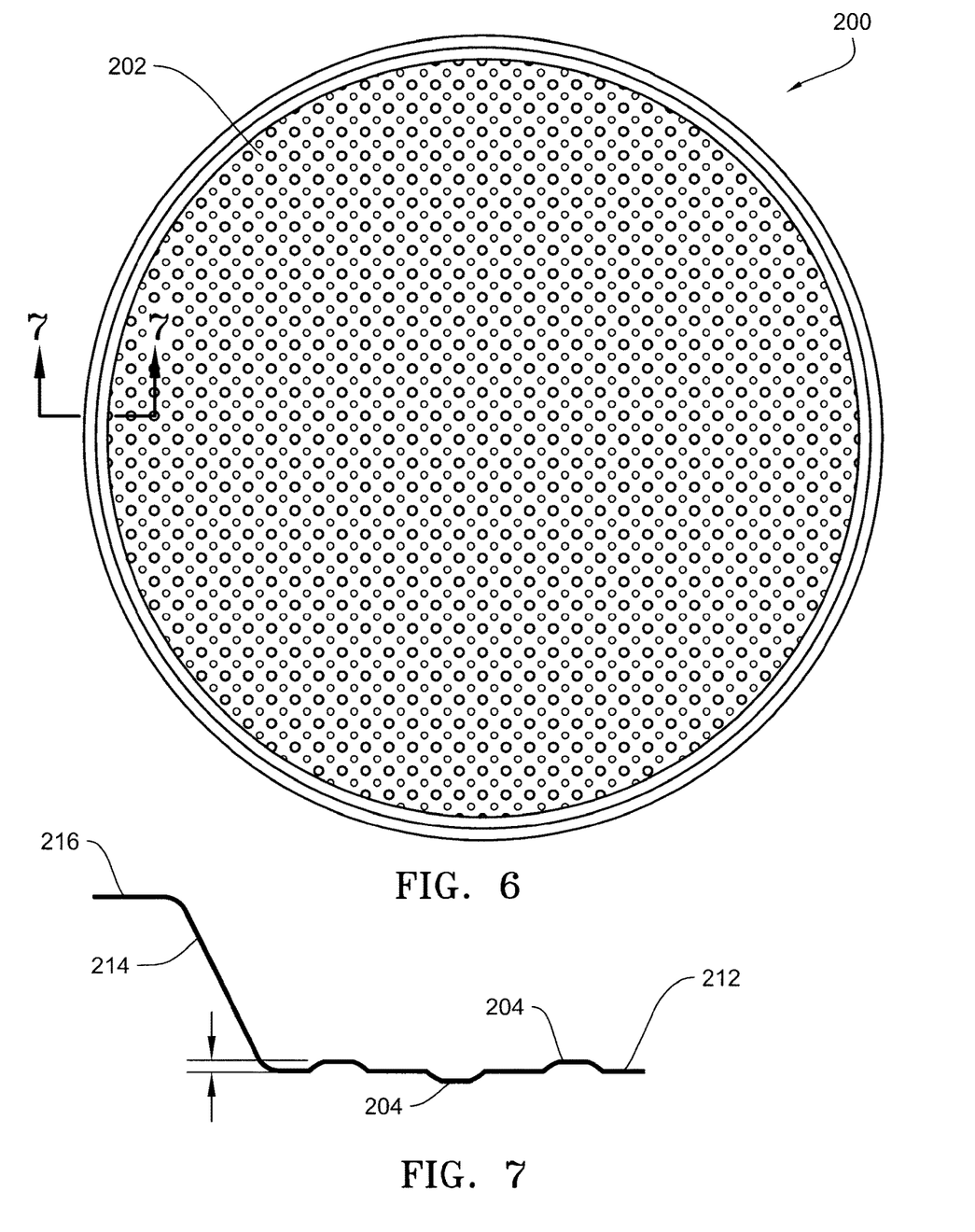
FIG. 6 is a plan view of one embodiment of a paper-based bakeable tray similar to the conventional paper-based bakeable tray of FIG. 1, but with an embossing pattern comprising upward projections and downward depressions on the bottom surface of the tray.
FIG. 7 is a partial cross-sectional view of the embossed paper-based bakeable tray of FIG. 6 as viewed along lines 7-7 of FIG. 6.

FIG. 6 illustrates an alternative embodiment of an embossed paper-based bakeable tray 200 similar to the conventional paper-based tray 10 of FIG. 1, but with an embossed pattern 202 formed in the bottom surface 212 of the tray and wherein the embossed pattern 202 comprises both upward and downward projections 204. The embossed paper-based bakeable tray 200 has sidewalls 214 which may include a peripheral lip 216. FIG. 7 is a partial cross-sectional view of the embossed tray 200 as viewed along lines 7-7 of FIG. 6 showing the embossing pattern 202 comprising both the upward and downward projections 204.

Figures 8, 9, 10:
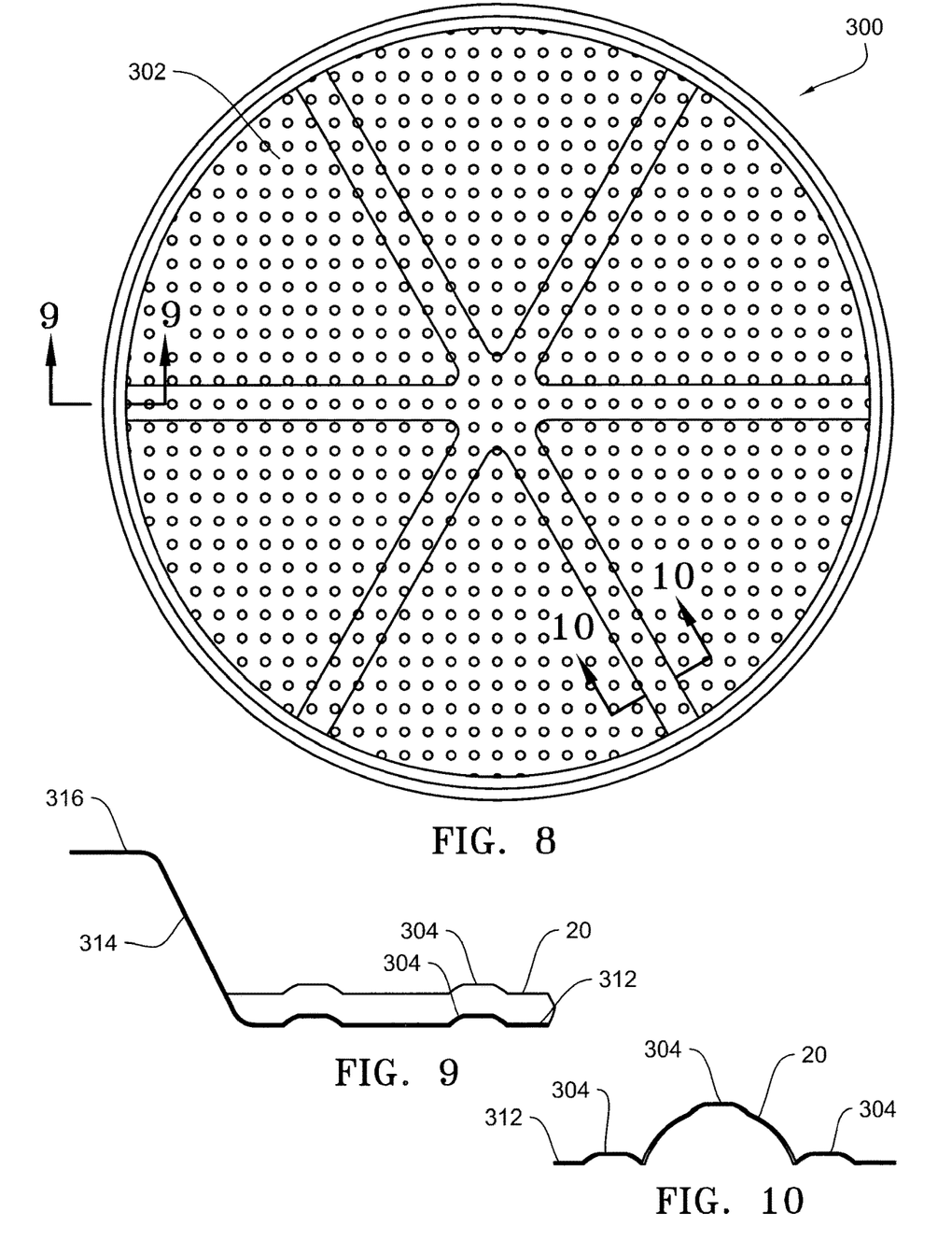
FIG. 8 is a plan view of one embodiment of a paper-based bakeable tray with raised contour surfaces in the form of a pinwheel as in FIG. 2, but with an embossing pattern on one side of the bottom of the tray.
FIG. 9 is a partial cross-sectional view of the embossed paper-based bakeable tray of FIG. 8 as viewed along lines 9-9 of FIG. 8.
FIG. 10 is a partial cross-sectional view of the embossed paper-based bakeable tray of FIG. 8 as viewed along lines 10-10 of FIG. 8.
Figure 20:
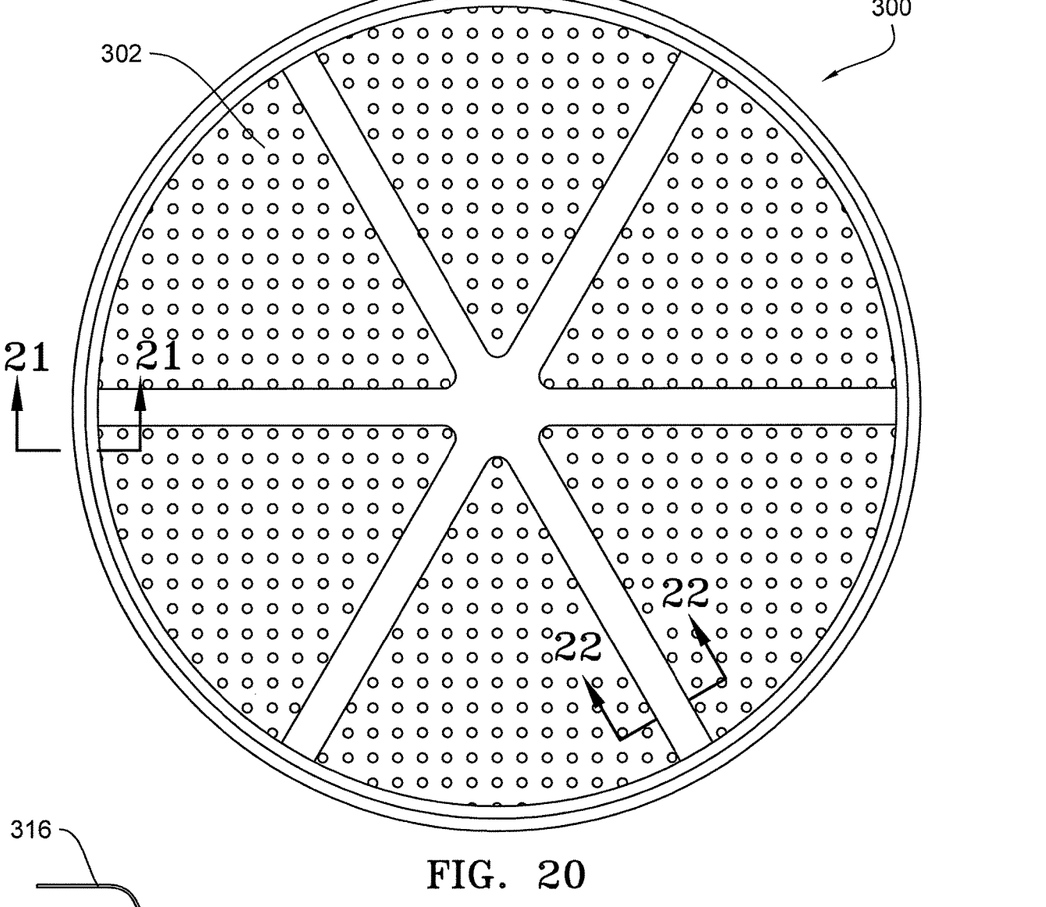
FIG. 20 is a plan view of one embodiment of a paper-based bakeable tray with raised contour surfaces in the form of a pinwheel as in FIG. 8, but with an embossing pattern on one side of the bottom of the tray and located only between the contour surfaces.
Figures 21, 22:
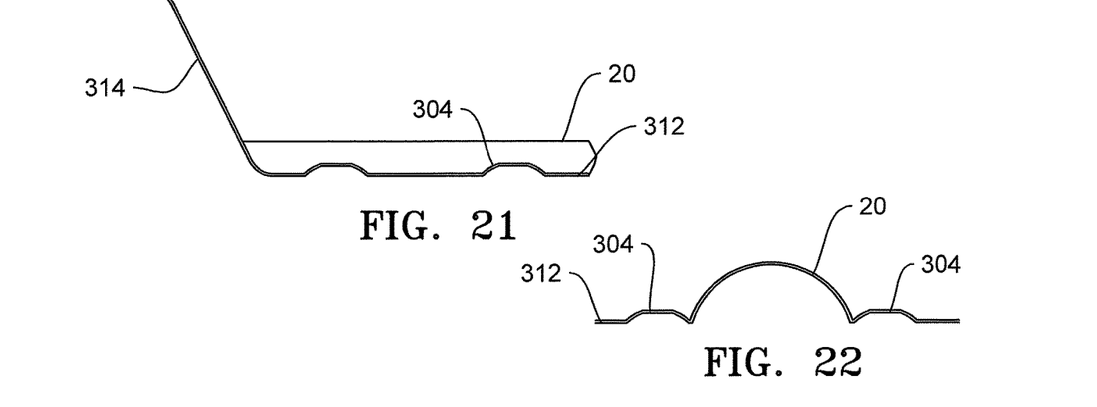
FIG. 21 is a partial cross-sectional view of the embossed paper-based bakeable tray of FIG. 20 as viewed along lines 21-21 of FIG. 20
FIG. 22 is a partial cross-sectional view of the embossed paper-based bakeable tray of FIG. 20 as viewed along lines 22-22 of FIG. 20.

FIG. 8 illustrates an alternative embodiment of an embossed paper-based bakeable tray 300 similar to the conventional paper-based tray 10 of FIG. 2 having raised contour surfaces 20 in the form of a pinwheel, but with an embossed pattern 302 formed in the bottom surface 312 of the tray and wherein the embossed pattern 302 comprises upward projections 304. The embossed paper-based bakeable tray 300 has sidewalls 314 which may include a peripheral lip 316. FIG. 9 is a partial cross-sectional view of the embossed tray 300 as viewed along lines 9-9 of FIG. 8. FIG. 10 is a partial cross-sectional view of the embossed tray 300 as viewed along lines 10-10 of FIG. 8 illustrating the cross-sectional view of one of the raised contour surfaces 20 of the pinwheel pattern. As illustrated, the raised contour surfaces 20 of the pinwheel pattern include the embossed pattern 302, but it should be appreciated that, if desired, the embossed pattern 302 may only be provided between the raised contour surfaces 20. An embodiment of this configuration with the embossed pattern 302 existing only between the raised contour surfaces 20 is illustrated in FIG. 20. Similarly, a cross-sectional view is illustrated in FIG. 21, as viewed along lines 21-21 of FIG. 20.

Figures 11, 12, 13:
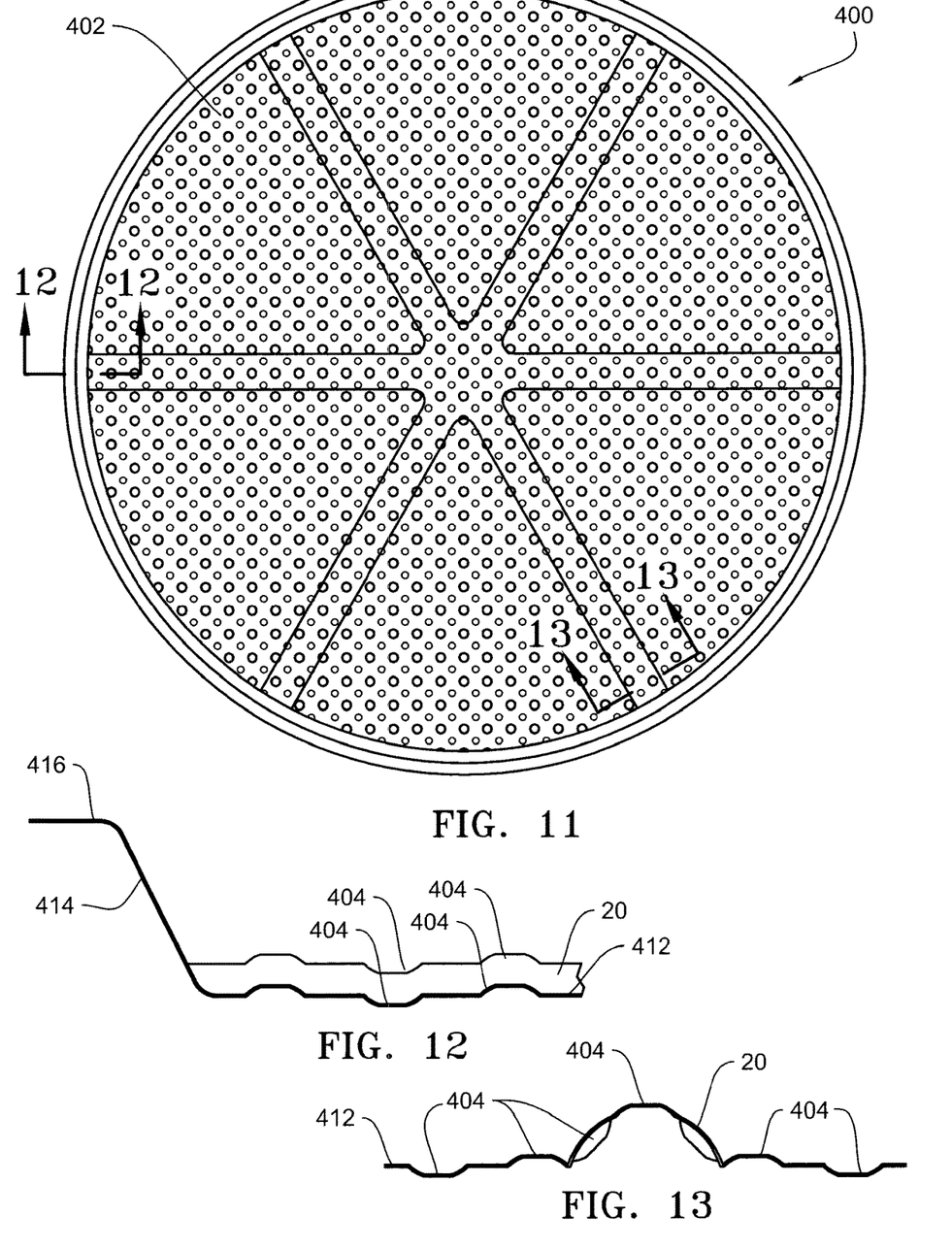
FIG. 11 is a plan view of one embodiment of a paper-based bakeable tray with raised contour surfaces in the form of a pinwheel as in FIG. 2, but with an embossing pattern comprising upward projections and downward depressions on the bottom surface of the tray.
FIG. 12 is a partial cross-sectional view of the embossed paper-based bakeable tray of FIG. 11 as viewed along lines 12-12 of FIG. 11.
FIG. 13 is a partial cross-sectional view of the embossed paper-based bakeable tray of FIG. 11 as viewed along lines 13-13 of FIG. 11.

FIG. 11 illustrates an alternative embodiment of an embossed paper-based bakeable tray 400 similar to the conventional paper-based tray 10 of FIG. 2 having raised contour surfaces 20 in the form of a pinwheel, but with an embossed pattern 402 formed in the bottom surface 412 of the tray and wherein the embossed pattern 402 comprises both upward and downward projections 404. The embossed paper-based bakeable tray 400 has sidewalls 414 which may include a peripheral lip 416. FIG. 12 is a partial cross-sectional view of the embossed tray 400 as viewed along lines 12-12 of FIG. 11. FIG. 13 is a partial cross-sectional view of the embossed tray 400 as viewed along lines 13-13 of FIG. 11 illustrating the cross-sectional view of one of the raised contour surfaces 20 of the pinwheel pattern. As illustrated, the raised contour surfaces 20 of the pinwheel pattern include the embossed pattern 402, but it should be appreciated that, if desired, the embossed pattern 402 may only be provided between the raised contour surfaces 20.

Figure 14:
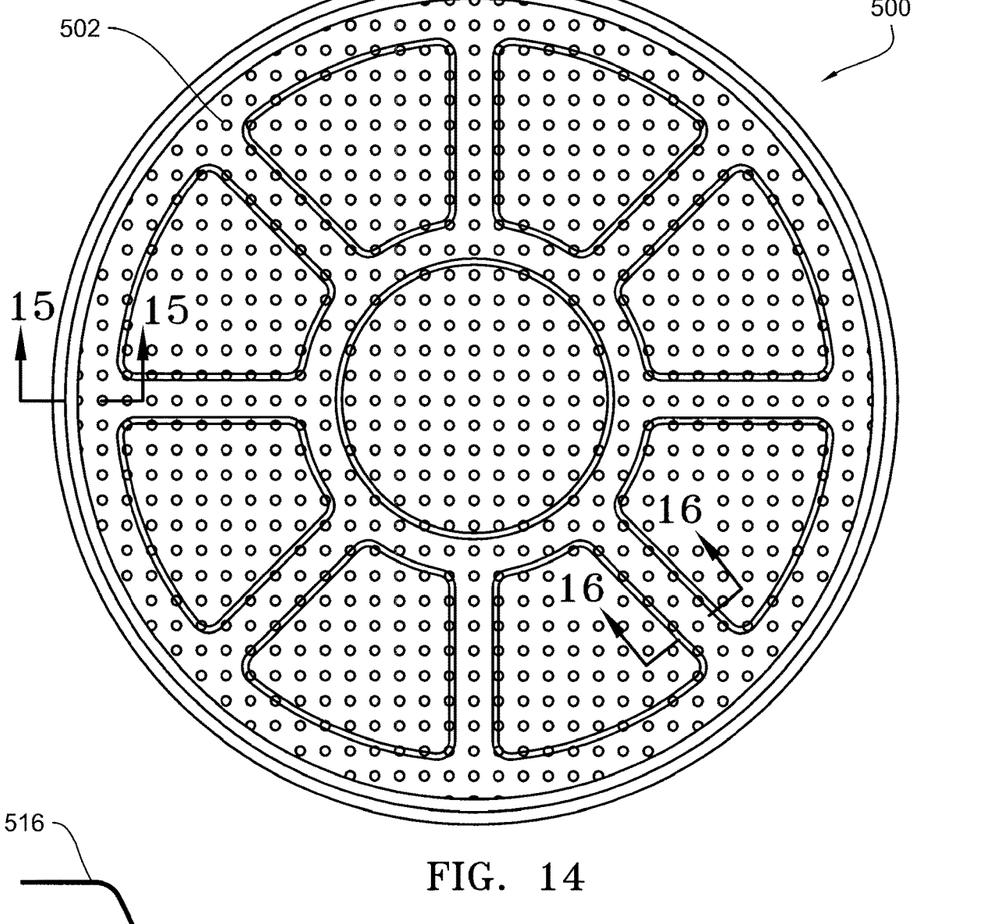
FIG. 14 is a plan view of one embodiment of a paper-based bakeable tray with raised contour surfaces in the form of an octagonal pattern as in FIG. 3, but with an embossing pattern on one side of the bottom of the tray.
Figures 15, 16:
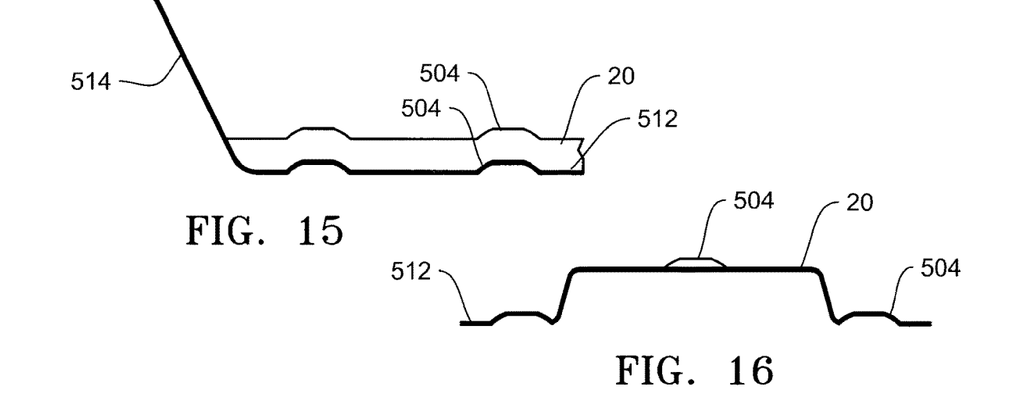
FIG. 15 is a partial cross-sectional view of the embossed paper-based bakeable tray of FIG. 14 as viewed along lines 15-15 of FIG. 14.
FIG. 16 is a partial cross-sectional view of the embossed paper-based bakeable tray of FIG. 14 as viewed along lines 16-16 of FIG. 14.

FIG. 14 illustrates an alternative embodiment of an embossed paper-based bakeable tray 500 similar to the conventional paper-based tray 10 of FIG. 3 having raised contour surfaces 20 in the form of an octagonal pattern, but with an embossed pattern 502 formed in the bottom surface 512 of the tray and wherein the embossed pattern 502 comprises upward projections 504. The embossed paper-based bakeable tray 500 has sidewalls 514 which may include a peripheral lip 516. FIG. 15 is a partial cross-sectional view of the embossed tray 500 as viewed along lines 15-15 of FIG. 14. FIG. 16 is a partial cross-sectional view of the embossed tray 500 as viewed along lines 16-16 of FIG. 14 illustrating the cross-sectional view of one of the raised contour surfaces 20 of the octagonal pattern. As illustrated, the raised contour surface 20 of the octagonal pattern includes the embossed pattern 502, but it should be appreciated that, if desired, the embossed pattern 502 may only be provided between the raised contour surfaces 20.

Figures 17, 18, 19:
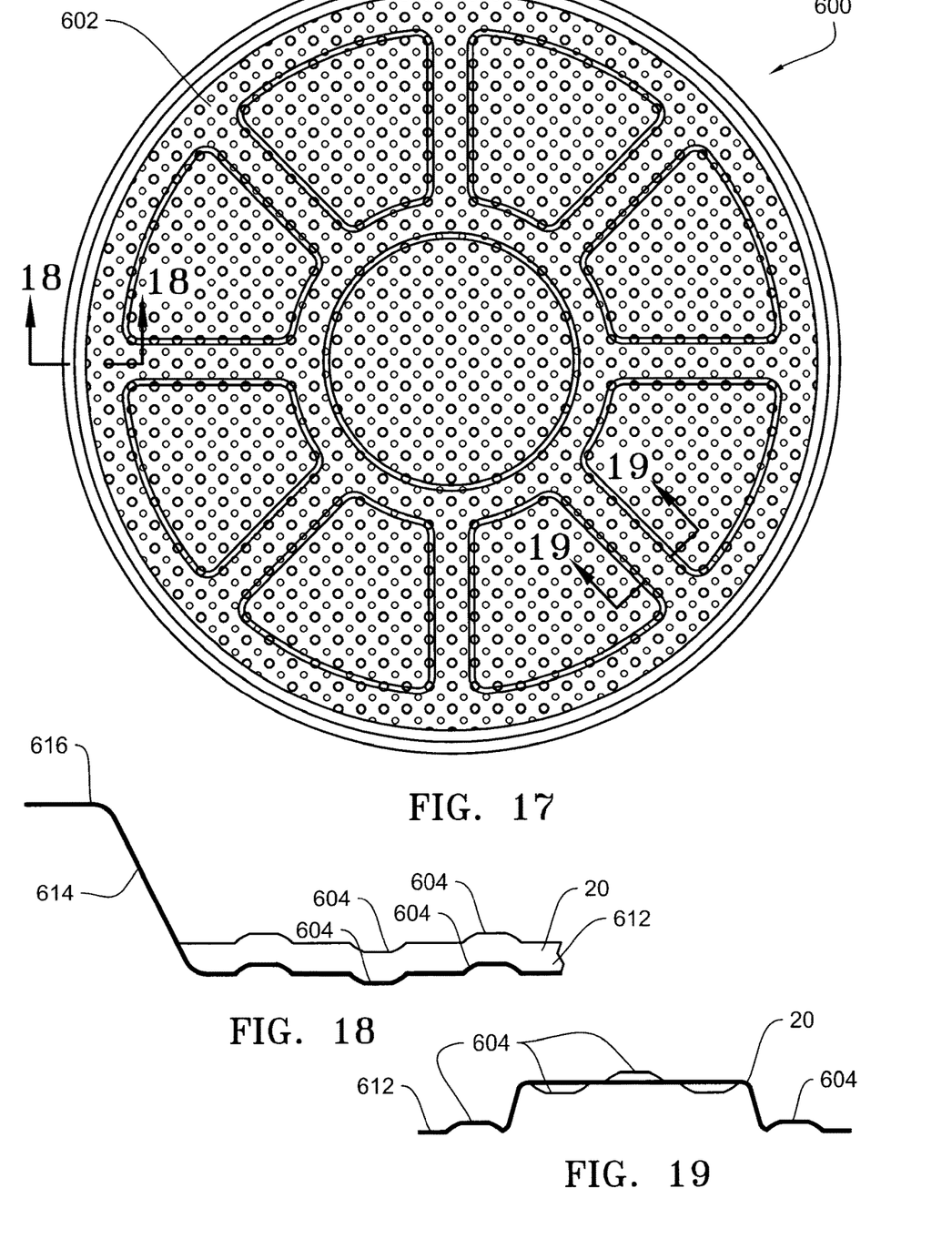
FIG. 17 is a plan view of one embodiment of a paper-based bakeable tray with raised contour surfaces in the form of an octagonal pattern as in FIG. 3, but with an embossing pattern comprising upward projections and downward depressions on the bottom surface of the tray.
FIG. 18 is a partial cross-sectional view of the embossed paper-based bakeable tray of FIG. 17 as viewed along lines 18-18 of FIG. 17.
FIG. 19 is a partial cross-sectional view of the embossed paper-based bakeable tray of FIG. 17 as viewed along lines 19-19 of FIG. 17.

FIG. 17 illustrates a an alternative embodiment of an embossed paper-based bakeable tray 600 similar to the conventional paper-based tray 10 of FIG. 3 having raised contour surfaces 20 in the form of an octagonal pattern, but with an embossed pattern 602 formed in the bottom surface 612 of the tray and wherein the embossing pattern 602 comprises both upward and downward projections 604. The embossed paper-based bakeable tray 600 has sidewalls 614 which may include a peripheral lip 616. FIG. 18 is a partial cross-sectional view of the embossed tray 600 as viewed along lines 18-18 of FIG. 17. FIG. 19 is a partial cross-sectional view of the embossed tray 600 as viewed along lines 19-19 of FIG. 17 illustrating the cross-sectional view of one of the raised contour surfaces 20 of the octagonal pattern. As illustrated, the raised contour surface 20 of the octagonal pattern includes the embossed pattern 602, but it should be appreciated that, if desired, the embossed pattern 602 may only be provided between the raised contour surfaces 20.

Each of the embossed paper-based bakeable trays 100, 200, 300, 400, 500, 600 may be formed in the same manner using the same type of thermoforming press used to produce conventional paperboard trays 10 but with the desired embossing pattern formed in the face of the male and/or female dies used in the thermoforming press. The embossed trays may be used for a number of purposes and may take any desired shape. For example, rather than being a circular tray as shown, the tray may be rectangular or triangular or it may take the shape of the food product.

The embossing patterns 102, 202, 302, 402, 502, 602 comprises a series of closely spaced projections 104, 204, 304, 404, 504, 604 formed into the bottom surface 112, 212, 312, 412, 512, 612 of the paper-based embossed trays 100, 200, 300, 400, 500, 600. The projections may be any suitable configuration, size and spacing. As an example, the projections may have a diameter of about 3/16 inch, and a height range between about 0.010 to about 0.040 inches, with a center-to-center spacing of about 1/2 inch. It should be appreciated, however, that the projections need not be round or circular and may have any desired size or shape, including any polygonal shape with widths and lengths or diameters between about 1/8 inch to about 1 inch, and may be spaced at distances ranging from about 3/8 inch to about 2 inches depending on the size of the projections.

The projections 104, 204, 304, 404, 504, 604 serve to intermittently support the food product thereby allowing air circulation below the food product so the food does not become soggy due to the collection of condensation, drippings or juices from the food as it is being cooked or after cooking. The projections also provide an air space which minimizes heat transfer via conduction thereby keeping the food warmer for a longer period of time. With the embossed trays having both upward and downward projections, the downward projections or depressions may permit additional air circulation and serve as small wells in which condensation, food juices or drippings are collected.

It has been found that paper-based bakeable trays having an embossing patterns as described herein improves the quality of certain foods when reheating or baking, due to the projections creating an air space and allowing more air circulation below the food. For example it has been found that if a conventional flat (non-embossed) paper-based bakeable tray having a flat bottom surface as in FIG. 1 is formed with an embossing pattern as described herein, and if this embossed trays are then used to bake pizza, the resulting crust is more uniformly cooked, is crispier and has a more uniform golden-brown crust. It was also found that if a black colored, conventional flat (non-embossed) paper based bakeable tray such as illustrated in FIG. 1 is formed with an embossing pattern as described herein so as to create a black embossed paperboard tray, the resulting crust is even crispier and more golden-brown.

The embossed trays 100, 200, 300, 400, 500, 600 may be made of premium grade solid bleached sulfate (SBS) or any other suitable type of paper, paperboard, cardstock or cardboard material or any other type of pulp-based, fiber-based or cellulose-based material, whether from wood, other plant or natural material or from synthetic material.

Depending on the application and intended use of the embossed trays 100, 200, 300, 400, 500, 600 and the type of food it is intended to contact, the embossed trays may include appropriate barrier coatings as well known to those of skill in the art such that the embossed trays are suitable for baking, heating, or reheating foods. Additionally, or in the alternative, the embossed trays may include barrier coatings such that the embossed trays are freezer-to-oven ready and/or impermeable to liquids.

The foregoing description is presented to enable one of ordinary skill in the art to make and use the invention and is provided in the context of a patent application and its requirements. Various modifications to the embodiments of the apparatus and the general principles and features described herein will be readily apparent to those of skill in the art. Thus, the present invention is not to be limited to the embodiments described above and illustrated in the drawing figures, but is to be accorded the widest scope consistent with the spirit and scope of the appended claims.

The invention claimed is:

1. An embossed paper-based bakeable tray for baking a food product, comprising:
    a tray formed of paper-based material and capable of withstand oven temperatures between about 150 degrees Fahrenheit and about 500 degrees Fahrenheit, said tray including:
        a bottom area with an upper surface plane and a lower surface plane;
        a continuous peripheral sidewall disposed around said bottom area and extending a distance upwardly from said bottom area thereby defining a tray volume in which the food product is received;
        an embossed pattern formed in said bottom area, said embossed pattern including:
            a plurality of upper projections extending upwardly from about 0.01 to about 0.04 inches above said upper surface plane such that an uppermost end of said upper projections form an intermittent upper support surface above said upper surface plane, whereby said intermittent upper support surface supports the food product above said upper surface plane so as to provide an air space between an underside of the food product and said upper surface plane.

2. The embossed paper-based bakeable tray of claim 1, wherein said tray has a shape selected from the group consisting of a circle, a rectangle, a triangle.

3. The embossed paper-based bakeable tray of claim 1, wherein said tray has a shape generally in the shape of the food product received therein.

4. The embossed paper-based bakeable tray of claim 1, wherein said tray further includes a barrier coating such that the tray is impermeable to the liquid collected in the reservoirs.

5. The embossed paper-based bakeable tray of claim 1, wherein said paper-based material is plant material.

6. The embossed paper-based bakeable tray of claim 5, wherein said plant material is premium grade solid bleached sulfate (SBS) paper.

7. The embossed paper-based bakeable tray of claim 5, wherein said tray has a black color.

8. The embossed paper-based bakeable tray of claim 1, wherein said bottom area further includes raised contour surfaces.

9. The embossed paper-based bakeable tray of claim 8, wherein said raised contour surfaces are in a form of pinwheel pattern.

10. The embossed paper-based bakeable tray of claim 9, wherein said embossed pattern is only between said raised surfaces of said pinwheel pattern.

11. The embossed paper-based bakeable tray of claim 8, wherein said raised contour surfaces are in a form of an octagonal pattern.

12. The embossed paper-based bakeable tray of claim 11, wherein said embossed pattern is only between said raised surfaces of said octagonal pattern.

13. The embossed paper-based bakeable tray of claim 1, said embossed pattern further including:
    a plurality of downward projections extending downwardly from said upper surface plane thereby forming a plurality of reservoirs below said upper surface plane and the food product for collecting liquid which may drip from the food product, said plurality of downward projections also extending downward from about 0.01 inches to about 0.04 inches below said lower surface plane such that a lowermost end of said downward projections form an intermittent lower support surface below said lower surface plane, whereby said intermittent lower support surface provides an air space allowing for air circulation between said lower surface plane and a support surface on which said tray is placed.

14. The embossed paper-based bakeable tray of claim 13, wherein said tray has a shape selected from the group consisting of a circle, a rectangle, a triangle.

15. The embossed paper-based bakeable tray of claim 13, wherein said tray has a shape generally in the shape of the food product received therein.

16. The embossed paper-based bakeable tray of claim 13, wherein said tray further includes a barrier coating such that the tray is impermeable to the liquid collected in the reservoirs.

17. The embossed paper-based bakeable tray of claim 13, wherein said paper-based material is plant material.

18. The embossed paper-based bakeable tray of claim 17, wherein said plant material is premium grade solid bleached sulfate (SBS) paper.

19. The embossed paper-based bakeable tray of claim 17, wherein said tray has a black color.

20. The embossed paper-based bakeable tray of claim 13, wherein said bottom area further includes raised contour surfaces.

21. The embossed paper-based bakeable tray of claim 20, wherein said raised contour surfaces are in a form of pinwheel pattern.

22. The embossed paper-based bakeable tray of claim 21, wherein said embossed pattern is only between said raised surfaces of said pinwheel pattern.

23. The embossed paper-based bakeable tray of claim 20, wherein said raised contour surfaces are in a form of an octagonal pattern.

24. The embossed paper-based bakeable tray of claim 23, wherein said embossed pattern is only between said raised surfaces of said octagonal pattern.

* * * * *